United States Patent
Wienke et al.

(10) Patent No.: US 8,468,793 B2
(45) Date of Patent: Jun. 25, 2013

(54) CHAIN COMPRISING LINKS

(75) Inventors: Dietrich D. Wienke, Elsoo (NL); Roelof R. Marissen, Born (NL); Martinus Johannes Nicolaas M. J. N. Jacobs, Heerlen (NL); Christiaan Henri Peter Dirks, Dilsen (BE)

(73) Assignee: DSM IP Assets B.V., Heerlen (NL)

( * ) Notice: Subject to any disclaimer, the term of this patent is extended or adjusted under 35 U.S.C. 154(b) by 191 days.

(21) Appl. No.: 12/921,200

(22) PCT Filed: Mar. 13, 2009

(86) PCT No.: PCT/EP2009/001867
§ 371 (c)(1),
(2), (4) Date: Sep. 7, 2010

(87) PCT Pub. No.: WO2009/115249
PCT Pub. Date: Sep. 24, 2009

(65) Prior Publication Data
US 2011/0011051 A1    Jan. 20, 2011

(30) Foreign Application Priority Data
Mar. 17, 2008    (EP) ..................................... 08004935

(51) Int. Cl.
*F16G 13/12*    (2006.01)
(52) U.S. Cl.
USPC ........... 59/78; 59/84; 59/92; 112/417; 294/74
(58) Field of Classification Search
USPC .......... 59/78, 83, 84, 90, 92; 112/417; 294/74
See application file for complete search history.

(56) References Cited

U.S. PATENT DOCUMENTS

| 540,498 | A | | 6/1895 | Klatte | |
|---|---|---|---|---|---|
| 3,153,898 | A | * | 10/1964 | Gerhardt | 59/84 |
| 3,707,021 | A | * | 12/1972 | Norrman | 294/74 |
| 3,733,811 | A | * | 5/1973 | Florjancic | 59/35.1 |
| 4,232,619 | A | * | 11/1980 | Lindahl | 294/74 |
| 4,779,411 | A | * | 10/1988 | Kendall | 59/78 |
| 5,215,616 | A | | 6/1993 | Fillar | |
| 6,513,647 | B1 | * | 2/2003 | Merten et al. | 198/733 |
| 2006/0259076 | A1 | * | 11/2006 | Burkhart et al. | 606/228 |

FOREIGN PATENT DOCUMENTS

| DE | 10 45 744 | 12/1958 |
|---|---|---|
| DE | 197 24 586 | 11/1998 |
| FR | 1 185 563 | 8/1959 |
| GB | 2 260 592 | 4/1993 |
| WO | 2005/066401 | 7/2005 |

OTHER PUBLICATIONS

Polyethylene (PE) Plastic, accessed Aug. 9, 2012, UL IDES, available at www.ides.com/info/generics/27/Polyethylene-PE.*
International Search Report for PCT/EP2009/001867, mailed Jul. 27, 2009.

* cited by examiner

*Primary Examiner* — David B Jones
(74) *Attorney, Agent, or Firm* — Nixon & Vanderhye P.C.

(57) ABSTRACT

The present invention relates to a chain comprising a plurality of first links (100) interconnected with a plurality of adjacent links, the first links comprising polymeric multifilament yarns (110) and having a thickness (Formula (I)), at least at the portion where they interconnect with the adjacent links wherein said adjacent links have a thickness (Formula (II)) at least at the portion where they interconnect with the first links and wherein the ratio (Formula (II)/Formula (I)) is at least 1.2. The invention further relates to the use of the chain for storing, securing, and handling cargo, e.g. in lifting, hauling and rigging.

14 Claims, 5 Drawing Sheets

CHAIN COMPRISING LINKS

This application is the U.S. national phase of International Application No. PCT/EP2009/001867, filed 13 Mar. 2009, which designated the U.S. and claims priority to European Application No. 08004935.6, filed 17 Mar. 2008, the entire contents of each of which are hereby incorporated by reference.

The present invention relates to a chain comprising a plurality of first links interconnected with a plurality of adjacent links, the first links comprising polymeric multifilament yarns and having a thickness $T_1$ at least at the portion where they interconnect with the adjacent links. The invention further relates to the use of the chain for storing, securing, and handling cargo, e.g. in lifting, hauling and rigging.

An example of a chain with links comprising polymeric multifilament yarns is known from U.S. Pat. No. 4,779,411. This publication discloses a chain with links having a core of aromatic polyimide (aramid) multifilament yarns, sheathed with a woven outer fabric. It was found that in the chain of U.S. Pat. No. 4,779,411 only part of the yarns contributes effectively to transmitting forces from one link to another and therefore the chain has a reduced efficiency.

The object of the invention is to provide a chain having an improved efficiency as compared to known chains.

The object of the invention is achieved with a chain characterized in that said adjacent links have a thickness $T_2$ at least at the portion where they interconnect with the first links and wherein the ratio $T_2/T_1$ is at least 1.2.

Surprisingly, it was found that the chain of the invention has an improved efficiency as compared to a chain having links of equivalent construction as those of the inventive chain but wherein the ratio $T_2/T_1$ is below 1.2.

A chain wherein adjacent links have a different thickness but wherein the ratio $T_2/T_1$ is below 1.2 is known from DE 19724586. This publication discloses a scrapper chain wherein the vertical chain links are flattened to reduce the overall height of the chain while the horizontal ones have a constant thickness al around their circumference. However, the thickness of two adjacent links, i.e. a vertical one and a horizontal one, at the portion where they interconnect is the same, making thus the ratio $T_2/T_1$ equal to 1.

By the portion where a link interconnects with another link is herein understood the portion from the circumference of the link in contact with the other link when the chain is under load.

Preferably, the ratio $T_2/T_1$ is at least 1.5, more preferably at least 2.0, even more preferably at least 4.0, yet even more preferably at least 6.0, most preferably at least 8.0. Preferably, the ratio $T_2/T_1$ is at most 50, more preferably at most 40, most preferably at most 30. The ratio $T_2/T_1$ can easily be adjusted by varying the thicknesses of the links comprising the chain of the invention. It was found that by increasing the ratio $T_2/T_1$, the efficiency of the chain also increases.

Preferably, the first links of the chain of the invention are interconnected with the adjacent links of the chain of the invention in an alternating manner, i.e. every two first links are connected to each other via an adjacent link. The advantage thereof is that the efficiency of the chain of the invention is increased.

Preferably the chain of the invention has an efficiency of at least 0.65 cN·m/g, more preferably at least 0.7 cN·m/g, even more preferably at least 0.9 cN·m/g, most preferably at least 1 cN·m/g. The efficiency of the chain can be increased for example by increasing the ratio $T_2/T_1$.

Preferably, the breaking strength of the chain of the invention is at least 1 kN, more preferably at least 5 kN, even more preferably at least 10 kN, yet even more preferably at least 30 kN, yet even more preferably at least 50 kN, yet even more preferably at least 100 kN, yet even more preferably at least 1000 kN, yet even more preferably at least 10.000 kN, yet even more preferably at least 50.000 kN, yet even more preferably at least 100.000 kN, yet even more preferably at least 150.000 kN, yet even more preferably at least 500.000 kN, most preferably at least $10^6$ kN. To increase the breaking strength of the chain, stronger links can be used and furthermore, by choosing an appropriate $T_2/T_1$ ratio according to the invention.

Preferably, the breaking strength of the links of the chain of the invention is at least 1 kN, more preferably at least 10 kN, more preferably at least 100 kN. The skilled person knows how to increase the breaking strength of a link, for example by using stronger and/or thicker and/or more multifilament yarns when manufacturing said links.

Preferably, the first links have a total weight per unit length of at least 1 g/m, more preferably at least 3 g/m, even more preferably at least 10 g/m, yet even more preferably at least 30 g/m, most preferably at least 100 g/m. The weight per unit length can be increased by using higher titer and/or more multifilament yarns. A chain manufactured from heavier links is more suitable for use in heavy duty applications where heavy loads are to be lifted or secured in place.

The polymeric multifilament yarns, hereafter also referred to for simplicity as yarns, contained in the links of the chain of the invention, may be produced according to any technique known in the art, preferably by melt, solution or gel spinning. The polymeric materials used to produce said yarns may be any material that can be processed into said yarns. Suitable examples include polyamides and polyaramides, e.g. poly(p-phenylene terephthalamide) (known as Kevlar®); poly(tetrafluoroethylene) (PTFE); poly(p-phenylene-2,6-benzobisoxazole) (PBO) (known as Zylon®); LCP, e.g. Vectran® (copolymers of para hydroxybenzoic acid and para hydroxynaphtalic acid); poly{2,6-diimidazo-[4,5b-4',5'e]pyridinylene-1,4(2,5-dihydroxy)phenylene} (known as M5); poly (hexamethyleneadipamide) (known as nylon 6,6), poly(4-aminobutyric acid) (known as nylon 6); polyesters, e.g. polyethylene terephthalate), poly(butylene terephthalate), and poly(1,4 cyclohexylidene dimethylene terephthalate); polyolefins, e.g. homopolymers and copolymers of polyethylene and polypropylene; but also polyvinyl alcohols, polyacrylonitriles and the like. Also combinations of yarns manufactured from the above referred polymeric materials can be used for manufacturing the links.

The molecular mass ($M_w$) and/or the intrinsic viscosity (IV) of said polymeric materials can be easily selected by the skilled person in order to obtain yarns having desired mechanical properties, e.g. tensile strength. Moreover, the polymeric materials enumerated above are commercially available. The technical literature provides further guidance not only to which values for $M_w$ or IV a skilled person should use in order to obtain strong yarns, i.e. yarns with a high tensile strength, but also to how to produce such yarns.

Preferably, the yarns have a tensile strength of at least 1 GPa, preferably at least 1.5 GPa, more preferably at least 2 GPa, even more preferably at least 3 GPa, yet even more preferably at least 4 GPa, most preferably at least 5 GPa. The titer of said yarns is preferably at least 100 denier, even more preferably at least 1.000 denier, yet even more preferably at least 2.000 denier, yet even more preferably at least 3.000 denier, yet even more preferably at least 5.000 denier, yet even more preferably at least 7.000 denier, most preferably at least 10.000 denier. Such yarns are commercially available.

In a preferred embodiment, the polymeric material of choice is ultra high molecular weight polyethylene (UHMWPE) having an IV of preferably at least 3 dl/g, more preferably at least 4 dl/g, most preferably at least 5 dl/g. Preferably the IV is at most 40 dl/g, more preferably at most 25 dl/g, more preferably at most 15 dl/g. Preferably, the UHMWPE has less than 1 side chain per 100 C atoms, more preferably less than 1 side chain per 300 C atoms.

The UHMWPE yarns are preferably manufactured according to a gel spinning process as described in numerous publications, including EP 0205960 A, EP 0213208 A1, U.S. Pat. No. 4,413,110, GB 2042414 A, GB-A-2051667, EP 0200547 B1, EP 0472114 B1, WO 01/73173 A1, EP 1,699,954 and in "*Advanced Fibre Spinning Technology*", Ed. T. Nakajima, Woodhead Publ. Ltd (1994), ISBN 185573 182 7.

The links comprising yarns may be in the form of loops containing multiple windings of the yarns upon themselves, or of loops made from a rope or a strap comprising the yarns.

Figure 1:
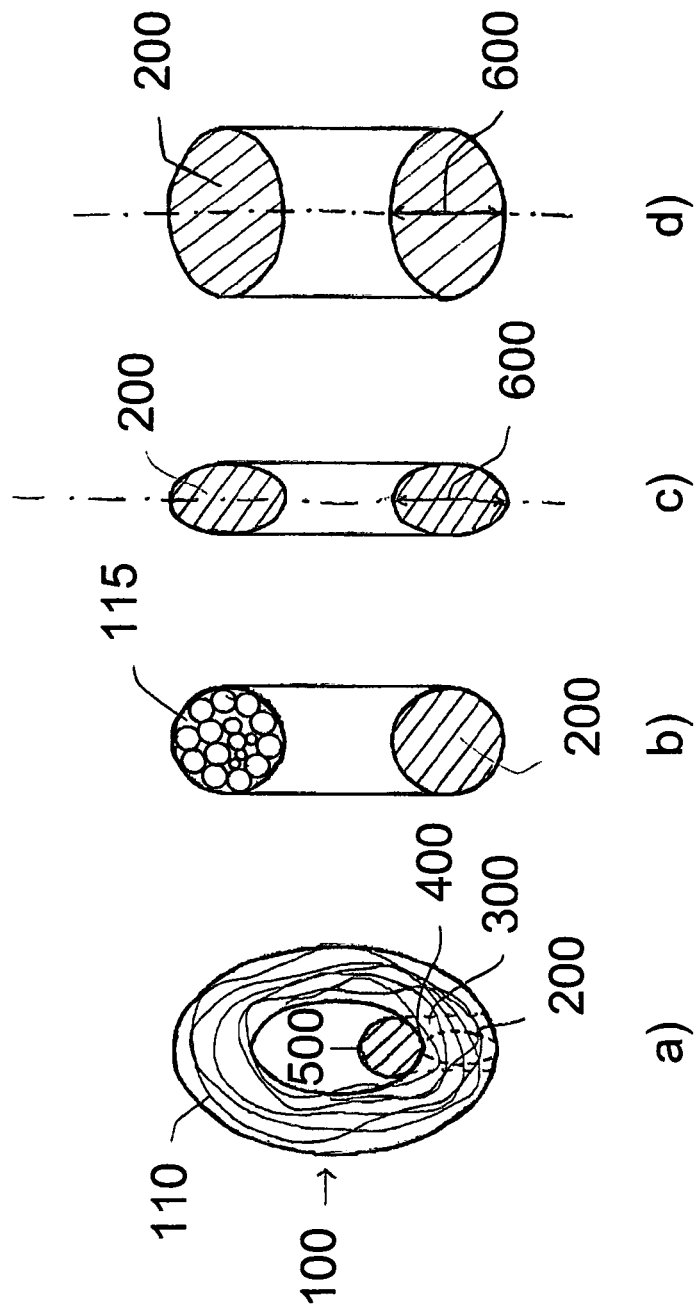
FIG. 1 depicts a link comprising yarns with various cross-sections thereof.

With regard to FIG. 1a), the link (100) comprising the yarns (110) may be loops contain multiple windings of the yarns upon themselves. The yarns may be adhered together by a matrix (115). Such a link may have a cross-section (200) that is circular (FIG. 1b)) or oval (FIGS. 1c) and d)) or it may have an irregular cross-section due to the windings of the yarns protruding outwards (not shown in FIG. 1).

Figure 2:
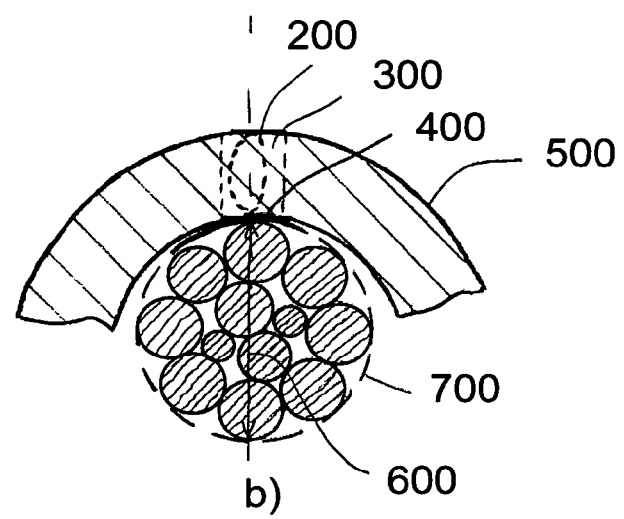
FIG. 2 depicts a portion from a link made of a rope.
Figure 2:
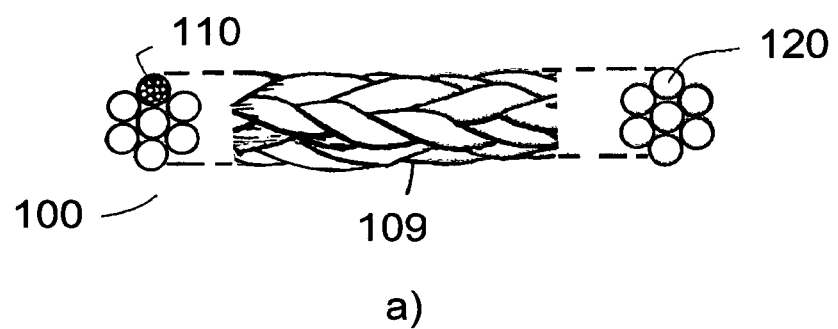

FIG. 2a) depicts a portion of a link (100) comprising yarns, the link being manufactured from loops made from a rope (103) with strands (120) comprising yarns (110). The loop obtained from the rope may be a single loop or multiple loops. The rope may be of any configuration known in the art, e.g. a twisted or braided rope or combinations thereof, e.g. twisted yarns subsequently braided to form the rope. FIG. 2a) shows a braided rope, however said figure should not be construed as imposing any limitation to the construction of the rope. Methods of manufacturing such ropes are known in the art as from example from U.S. Pat. No. 4,677,818; U.S. Pat. No. 5,931,076 and U.S. Pat. No. 6,321,520. The thickness of the rope may vary within large limits, preferably, the rope is a heavy-duty rope with a circular cross-section and having a thickness of at least 2 mm, more preferably at least 4 mm, even more preferably at least 6 mm, yet even more preferably at least 8 mm, most preferably at least 10 mm, since the advantages of the invention become more relevant the thicker the rope. Such a link usually has an irregular cross-section (FIG. 2b)) due to the outward protrusions of the strands of the rope.

In case of a link with an irregular cross-section as shown in FIG. 2b), it is more accurate to approximate the cross-section of such a link with an ellipse (700) and to use the axis (600) of the ellipse to define the thickness of the link. Both axis of the ellipse may be equal in length, in this particular case the irregular cross-section of the link being approximated with a circle. Links with an oval cross-section as depicted in FIG. 1c) and d) may also be approximated with an ellipse and the axis (600) thereof used to define the thickness of the link.

The free ends of the yarns or of the rope, may be connected with each other and/or to the body of the loop by known techniques, e.g. with a knot, adhesive bonding, or with a splice. In case of a rope the preferred connection method is with a splice.

Figure 3:
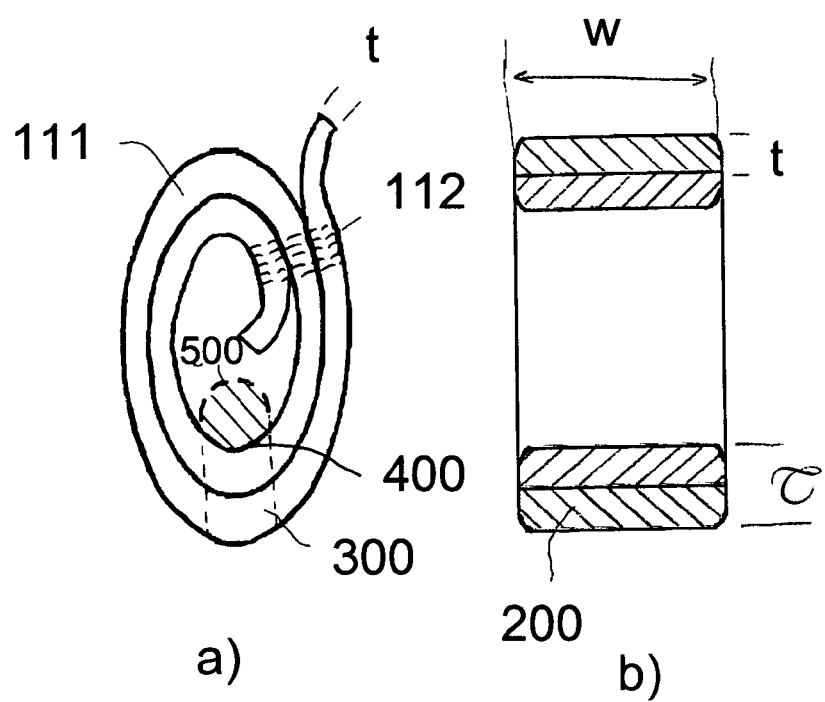
FIG. 3 depicts a link made of a strap or fabric.

A link comprising yarns may also be loops of a fabric or a strap comprising said yarns as depicted in FIG. 3. The fabric or the strap (111) is readily made for example by weaving or knitting the multifilament yarns into any construction known in the art, e.g. a plain and/or twill weave construction for instance. The strap preferably has an n-ply webbing construction, where n is preferably at least 4, more preferably 3 and most preferably 2. By strap is herein meant a flexible, elongated body having a thickness that is much smaller than its width (w). The fabric or the strap may be formed into a loop by known techniques utilized in the textile industry, such as stitching (112), and/or by adhesive bonding. When a strap is used to manufacture the links, by thickness $\mathcal{T}$ of the links is herein understood the thickness (t) of the strap multiplied with the number of the overlapping windings of the strap upon itself.

The thicknesses $\mathcal{T}_1$ and $\mathcal{T}_2$ of the first and adjacent links, respectively, of the chain of the invention are measured in the same manner. As exemplified in FIGS. 1a), 2b) and 3a), the thickness $\mathcal{T}$ of a link is measured at the portion (300) where the link (100) interconnects with the adjacent link (500), when the chain is unloaded and by keeping taut the yarns, the rope or the strap comprising the link to be measured. The thickness $\mathcal{T}$ of the link is measurable through a cross-section (200) of the link perpendicular to the area (400) where the link interconnects with the adjacent link. By keeping the yarns, rope or strap taut is herein understood that they are subjected to a load sufficient to prevent them from slacking but not strong enough to deform them. The area (400) is comprised in the plane of the link, i.e. the plane defined by the circumference of the link. In particular if a link has a circular cross-section section as in FIG. 1b), the thickness $\mathcal{T}$ is the diameter thereof.

Preferably, the links have a constant thickness $\mathcal{T}$ throughout their entire length.

In case of a link with a non-circular cross-section as in FIGS. 1c) and d) and/or with an irregular cross-section as in FIG. 2b), it is more accurate to define its thickness $\mathcal{T}$ as being equivalent with the length of the axis (600) of the ellipse (700) approximating the irregular cross-section, said axis being perpendicular to the adjacent link (500) in contact thereof. Methods to determine the dimensions of the ellipse (700) are known to the skilled person, an example thereof being correlating a photographic image of the irregular cross-section of the link with an ellipse of adjustable orientation and adjustable major and minor axis with the help of known processing software.

In a preferred embodiment, the links comprising yarns are loops obtained by winding and fusing UHMWPE yarns. Such loops may be manufactured by winding an UHMWPE yarn around a pair of wheels to form said loops, heating the yarn to a temperature below the melting point of the UHMWPE at which temperature the filaments comprising said yarn at least partly fuse, and stretching the loop by increasing the distance between the wheels, while simultaneously rotating the wheels. By increasing the inter-wheel distance, the filaments are drawn. Chains comprising such links are strong and moreover distribute the loads between links particularly well.

In an embodiment of the invention, the adjacent links may consist of a thermoplastic or thermosetting resin composition. Examples of suitable thermoplastic resins include polypropylene, polyethylene, polyester, polyimide, polyethylketone and the like. Examples of suitable thermosetting resins include resins of epoxy, polyester, polyurethane, polyimide, bismaleide and vinylester. The resin composition may also include fillers to improve the mechanical strength or other properties of such links, e.g. rigidity. The skilled person knows how to adjust the necessary amount of said fillers to obtain the desired mechanical properties for a link manufactured thereof. The technical literature indicates that increasing the amount of filler within the resin enhances its strength and also provides results for tensile tests performed in accordance with ASTM D638 on resins with different amounts of filler. Suitable fillers are calcium carbonate, silicon oxide and/or fibers of glass, carbon, aramid and/or metal, e.g. steel, cupper. The shape and cross-section of the adjacent links consisting of a thermoplastic or thermosetting resin composition may be any shape and any cross-section known in the art. Preferably, they have a circular cross-section. If the cross-section of such link is irregular, it may be approximated with an ellipse in order to determine its thickness.

In a preferred embodiment of the invention, the adjacent links of the chain of the invention comprise yarns.

In a further preferred embodiment of the invention, the adjacent links consist of a metal, e.g. steel, nickel, copper and alloys thereof, more preferably a light weight metal, e.g. aluminum, titanium, scandium, magnesium, zinc and alloys thereof. Of particular interest are standard wrought, cast or other aluminum alloys, for example alloys available under Aluminum Association (AA) designations 6061, 2024, 7075, 7079 and A 356. In a preferred embodiment, the adjacent links are cast out of magnesium or magnesium alloys, e.g. Al—Sc—Mg alloy. The advantage of using links made of lightweight metals is that the weight of the chain is further decreased. A further advantage is that such light metals have an increased strength to weight ratio. This is beneficial in application where transportation of heavy cargo is involved; as such chains contribute less to the total weight to be transported and therefore decreasing the necessary amount of fuel, while ensuring an improved fixation thereof. The shape and cross-section of the adjacent links consisting of a metal may be any shape and any cross-section known in the art. Preferably, they have a circular cross-section. If the cross-section of such link is irregular, it may be approximated with an ellipse in order to determine its thickness.

When a thermoplastic or thermosetting resin composition or metal is used for manufacturing the adjacent links, stronger links can be obtained by increasing their thickness $\tau$.

The chain of the invention may also comprise first links containing yarns and adjacent links containing yarns and/or manufactured from thermoplastic or thermosetting resin composition or metal or combinations thereof depending by the application wherein the chain is used.

Figure 4:
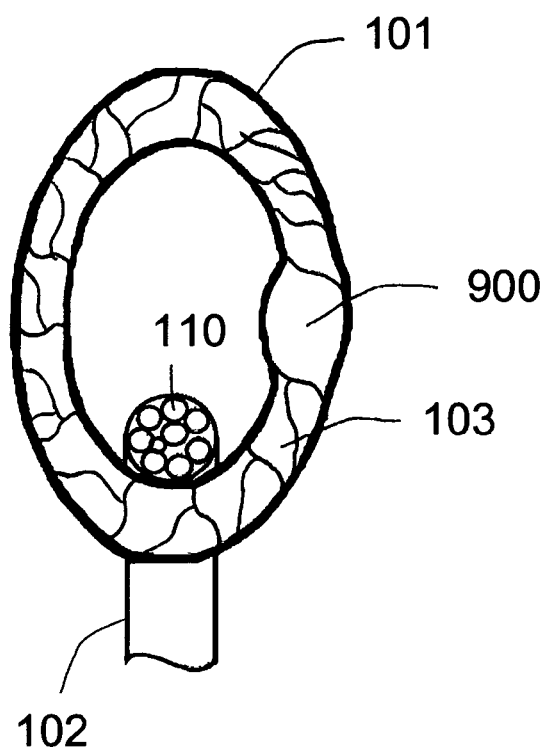
FIG. 4 depicts an embodiment of the chain of the invention, wherein both first and adjacent links are made of a rope.
Figure 5:
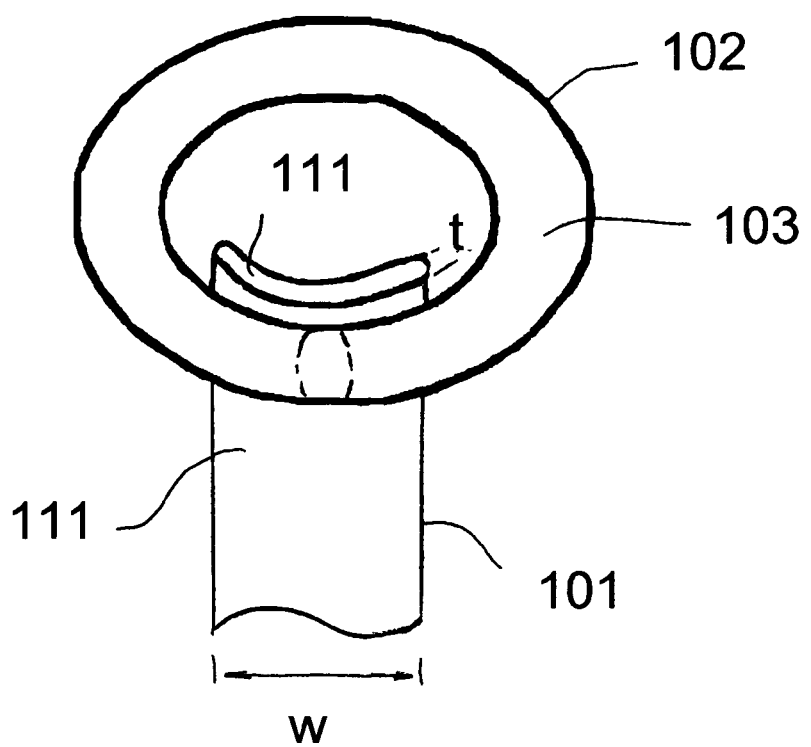
FIG. 5 depicts an embodiment of the chain of the invention, wherein the first links are made of a rope and the adjacent links are made of strap.

Preferred embodiments of the chain of the invention are presented in FIGS. 4 and 5.

In a preferred embodiment depicted in FIG. 4, both first (101) and adjacent (102) links comprise UHMWPE yarns (110). Preferably, both first and adjacent links are loops of a rope (103), said rope being preferably a braided rope. The free ends of the ropes are preferably connected with a splice (900). The chains of this embodiment have the additional advantage of contributing less to the weight to be lifted or handled and when used for lashing they present a reduced risk of inflicting damages to cargo. Additionally, they are less vulnerable to corrosion when used in for example humid environments.

In a further preferred embodiment depicted in FIG. 5, the first links (101) are loops of a strap (111) and the adjacent links (102) are loops of a rope (103). Preferably, the strap is wound upon itself at least 3 times, preferably at least 5 times, more preferably at least 7 times. Said strap has a thickness (t) of preferably at least 1 mm, more preferably at least 2 mm, most preferably at least 3 mm. Preferably, the strap has a width (w) over thickness ratio (w/t) of at least 5:1, more preferably at least 10:1, the w/t ratio preferably being at most 40:1, and even more preferably at most 20:1. Preferably, the strap and/or the rope comprise UHMWPE yarns. The chain of this embodiment shows an improved efficiency being suitable for use in applications where heavy loads are to be manipulated.

In a yet further preferred embodiment, the first links are loops of a strap or of a rope and the adjacent links consist of a material chosen from the group consisting of thermoplastic resin composition, thermosetting resin composition and metal. Preferably, said strap or rope comprises UHMWPE yarns. It was surprisingly found that the chain of this preferred embodiment showed increased dimensional stability under load. A drawback of known chains having links containing yarns is that the links are deformed under an applied load. Once the chain is tensioned the links close their loop, making therefore difficult to connect additional hooks or other means to the body of the chain. The chain of this embodiment presents these disadvantages to a lesser extent said chain always containing opened links, i.e. the adjacent links, even when subjected to a heavy load.

Even if the loops of the first links might become smaller, other chains, hooks or connecting means can easily be connected to the main chain body via the adjacent links even the chain is subjected to a heavy load. A further important advantage of the chain of this embodiment is that such a chain presents a better efficiency than a chain having only links comprising yarns. The invention therefore relates to a chain comprising a plurality of first links interconnected with a plurality of adjacent links, the first links comprising polymeric multifilament yarns, wherein said first links are interconnected with adjacent links consisting of metal.

The links of the chain of the invention may be further coated or contain flame retardants, coatings to reduce adhesion, colorants, delusterants, and the like.

The first and adjacent links may also be sheathed with a protective cover having any construction known in the art and manufactured from multifilament yarns as detailed above. Such a sheet is known for example from U.S. Pat. No. 4,779, 411. If a protective covered is used, its thickness is not to be taken into account when determining the thickness of the sheeted link.

Preferably, the chain of the invention has a linear construction, i.e. a construction wherein except for the last two links corresponding to the end of the chain, every first link of the chain is only interconnected with two adjacent links and every adjacent link the chain is only interconnected with two first links. When utilized, in for example storing, securing and handling cargo, other secondary chains may be connected to the body of the chain of the invention.

When installed, the chains of the invention are useful and reliable in providing secure anchorage of heavy cargo in extreme conditions, as for example a heavy military aircraft on the pitching deck of a carrier on heavy seas or in cargo aircraft in turbulent air.

The invention also relates to the use of the chain of the invention in storing, securing, and handling cargo, e.g. lifting, hauling and rigging, as for example in such activities as construction, cargo storage, and securing a roll on/off dumpster to a dumpster hauling truck or freight to commercial trucks, flat bed trailers, cargo-hold of an aircraft or naval ship and the like.

METHODS

IV for UHMWPE is determined according to ASTM D4020 at 135° C. using decalin as solvent for UHMWPE in accordance with said ASTM standard.

Tensile strength (or strength) and tensile modulus (or modulus) are defined and determined on multifilament yarns with a procedure in accordance with ASTM D 885M, using a nominal gauge length of the fibre of 500 mm, a crosshead speed of 50%/min and Instron 2714 clamps, of type Fibre Grip D5618C. On the basis of the measured stress-strain curve the modulus is determined as the gradient between 0.3 and 1% strain. For calculation of the modulus and strength, the tensile forces measured are divided by the titer; for UHMWPE multifilament yarns, values in GPa are calculated assuming a density of polyethylene of 0.97 g/cm$^3$.

Titre of a yarn is determined by weighing 10 meters of the yarn and transform the obtained value in denier (grams per 9000 meters).

Breaking strength of the links and of the chain is determined on dry samples using a Zwick 1484 Universal test machine at a temperature of approximately 21° C., and at a speed of 100 mm/min. The links and chain samples were tested using D-shackles, the ratio between the diameter of the shackles and that of the link connected to them was 5.

Efficiency (in N·m/g) of a link is determined by multiplying the breaking strength of the link with the length of the link and dividing the number so obtained by the weight of the link. The length of the link is obtained by measuring the length of the circumference of the link and dividing it by 2.

Efficiency (in N·m/g) of a chain is determined by dividing the breaking strength of the chain by the weight of a unit length (meter) of the chain.

EXAMPLES AND COMPARATIVE EXPERIMENT

Example 1

Links were manufactured by connecting into a single loop the free ends of a rope of thickness $\tau$ of about 5.5 mm with a splice. The rope contained UHMWPE multifilament yarns known under the name of Dyneema® SK75 and had a configuration 3×12×5280 dtex, i.e. a 3 strand laid rope, each strand made by laying 12 multifilament yarns each of 5280 dtex. The weight of each link was 26 g and the links had a strength of about 68 kN (1.31 kN·m/g).

A chain was made using 5 of the links of the above as first links, every two of them being connected by an adjacent link in an alternating manner. The adjacent links were made by looping the rope of the above seven times to create a bundle of loops and slightly twisting said bundle to stabilize the construction and to improve the packing of the portions of the rope making the loops. The free ends of the rope were connected by splicing them with each other. The thickness $\tau_2/\tau_1$ of the adjacent links so manufactured was about 15 mm.

For this embodiment the ratio $\tau_2$ =15/5.5 was 2.7. The weight of the chain was 69 g/m, the chain having a breaking strength of 51.7 kN and an efficiency of 0.75 kN·m/g.

Comparative Experiment 1 (CE1)

A chain was manufactured from 5 links, each link being made by connecting into a single loop the free ends of the rope of Example 1 with a splice. The weight of each link was 26 g and the links had a strength of about 68 kN (1.31 kN·m/g).

For this embodiment the ratio $\tau_2/\tau_1$ =5.5/5.5 was 1.

The weight of the chain was 5×26 g=130 g and its breaking strength was 37 kN. The efficiency of the chain was 0.66 kN·m/g.

Example 2

A chain was manufactured using a number of 5 chain links made according to CE1 as the first links and connecting every two of them in an alternating manner with an adjacent link manufactured from magnesium and having a circular cross-section. The thickness (diameter) $\tau_2$ of the magnesium links was 16 mm. The weight of the magnesium links was 16 g.

For this embodiment the ratio $\tau_2/\tau_1$ =16/5.5 was about 3.

The weight of the chain per unit length was 86 g/m and its breaking strength was 65 kN. Its efficiency was 0.76 kN·m/g.

Example 3

A woven strap (2-ply webbing) was made comprising the Dyneema® SK75 multifilament yarns of the comparative example. The thickness (t) of the strap was 1 mm and its width 12.5 mm. The linear density of the woven fabric in the warp direction was 11900 tex (11.9 g/m). Its breaking strength was 21 kN resulting in a strap efficiency of 1.76 kN·m/g.

Links were made from the strap by winding the strap 2 times upon itself. The free ends of the strap overlapped over a distance of 0.06 m. The free ends were connected to the body of the strap by stitching through all the strap parts in the free ends' overlapping portion. The thickness of the link at the area in contact with the adjacent link was (2×t) 2 mm. The weight of a link was 28.8 g (57.6 g/m). The strength of a link was 58.7 kN with an efficiency of 1.02 kN·m/g.

A chain was made by using as first links, three of the links made from the above strap and connecting every two of them in an alternating manner with an adjacent link manufactured from aluminum (Al 7075 T0) and having a circular cross-section. The thickness (diameter) $\tau_2$ of the adjacent links was 12 mm.

For this embodiment the ratio $\tau_2/\tau_1$ =12/6 was 2. The weight of the chain was 79 g/m, the chain having a breaking strength of 55 kN and an efficiency of 0.70 kN·m/g.

Comparative Experiment 2 (CE2)

A chain was manufactured consisting of three of the links made from the strap of Example 3, the chain having a weight of 60 g/m.

For this embodiment the ratio $\tau_2/\tau_1$ =2/2 was 1. The breaking strength of the chain was 55 kN with an efficiency of 0.46 kN·m/g.

The invention claimed is:

1. A chain comprising a plurality of first links and a plurality of adjacent links interconnected with the first links, wherein the first links comprise polymeric multifilament yarns and have a thickness $\tau_1$ at least at a portion thereof where the first links interconnect with the adjacent links when the chain is under load, and wherein the adjacent links have a thickness $\tau_2$ at least at a portion thereof where the adjacent links interconnect with the first links and wherein the ratio $\tau_2/\tau_1$ is at least 1.2.

2. The chain according to claim 1, wherein the first links are loops of multifilament yarns or of a rope comprising multifilament yarns or of a strap comprising multifilament yarns.

3. The chain according to claim 1, wherein the adjacent links are loops of multifilament yarns, of a rope or of a strap.

4. The chain according to claim 1, wherein the adjacent links are manufactured from a material chosen from the group consisting of light metals, thermosetting composition and thermoplastic composition.

5. The chain according to claim 1, wherein the multifilament yarns are UHMWPE multifilament yarns.

6. The chain according to claim 1, wherein the ratio $T_2/T_1$ is at least 2.0.

7. The chain according to claim 1, wherein every two first links are connected to each other via an adjacent link.

8. The chain according to claim 1, wherein the chain has an efficiency of at least 0.65 cN·m/g.

9. The chain according to claim 1, wherein the chain has a breaking strength of at least 1 kN.

10. The chain according to claim 1, wherein the first links have a total weight per unit length of at least 1 g/m.

11. The chain according to claim 1, wherein the polymeric multifilament yarns are gel-spun yarns of ultrahigh molecular weight polyethylene (UHMWPE).

12. The chain according to claim 1, wherein the adjacent links consist of a metal, chosen from the group consisting of steel, nickel, copper, aluminum, titanium, scandium, magnesium, zinc and alloys thereof.

13. The chain according to claim 1, wherein the first links are loops of a strap or of a rope and the adjacent links consist of a material chosen from the group consisting of thermoplastic resin composition, thermosetting resin composition and metal.

14. The chain according to claim 1, wherein the first and adjacent links are sheathed with a protective cover.

* * * * *